United States Patent [19]

Marks

[11] 3,821,340

[45] June 28, 1974

[54] METHOD AND APPARATUS FOR SEALING PIPE SECTIONS

[75] Inventor: Helmuth Marks, Berlin, Germany

[73] Assignee: Wilhelm Fischer, Berlin, Germany; a part interest

[22] Filed: May 19, 1972

[21] Appl. No.: 255,190

[52] U.S. Cl................. 264/45, 264/313, 277/34, 277/DIG. 2, 285/351, 285/370
[51] Int. Cl...... B29d 23/00, F16j 15/04, F16l 21/02
[58] Field of Search........ 285/284, 351, 370; 277/1, 277/34, 226, 228; 277/DIG. 2; 264/45, 313, 314, 315

[56] References Cited
UNITED STATES PATENTS

| | | | |
|---|---|---|---|
| 2,306,160 | 12/1942 | Freyssinet | 277/34 |
| 2,322,587 | 6/1943 | Payne | 285/284 |
| 2,999,780 | 9/1961 | Perrault | 264/314 |
| 3,080,269 | 3/1963 | Pollock et al. | 264/314 |
| 3,258,271 | 6/1966 | Hollingsworth | 277/1 |
| 3,508,766 | 4/1970 | Kessler et al. | 285/370 |
| 3,651,180 | 3/1972 | Glueckert | 264/314 |

Primary Examiner—Louis R. Prince
Assistant Examiner—Robert L. Smith
Attorney, Agent, or Firm—Young & Thompson

[57] ABSTRACT

A sealing sleeve for sealing between adjacent pipe ends, comprises a resilient member having two annular external surfaces one to be disposed in sealing contact in each pipe end. The sealing sleeve has an annular cavity therein adjacent each of the two annular surfaces, each cavity having a first opening that extends radially inwardly and a second opening that extends endwise axially. Each cavity contains a reinforcing element. In use, the sleeve is inserted in the adjacent pipe ends, and a foaming plastic cement that expands upon hardening is inserted through the first opening until it comes out the second opening. A pipe with inflatable collars having the same spacing as the cavities is then inserted in the sleeve and the collars are inflated into sealing contact with the internal surfaces of the sleeve adjacent the cavities, until the inserted material is hardened, after which the collars are deflated and the pipe is removed.

6 Claims, 1 Drawing Figure

PATENTED JUN 28 1974  3,821,340
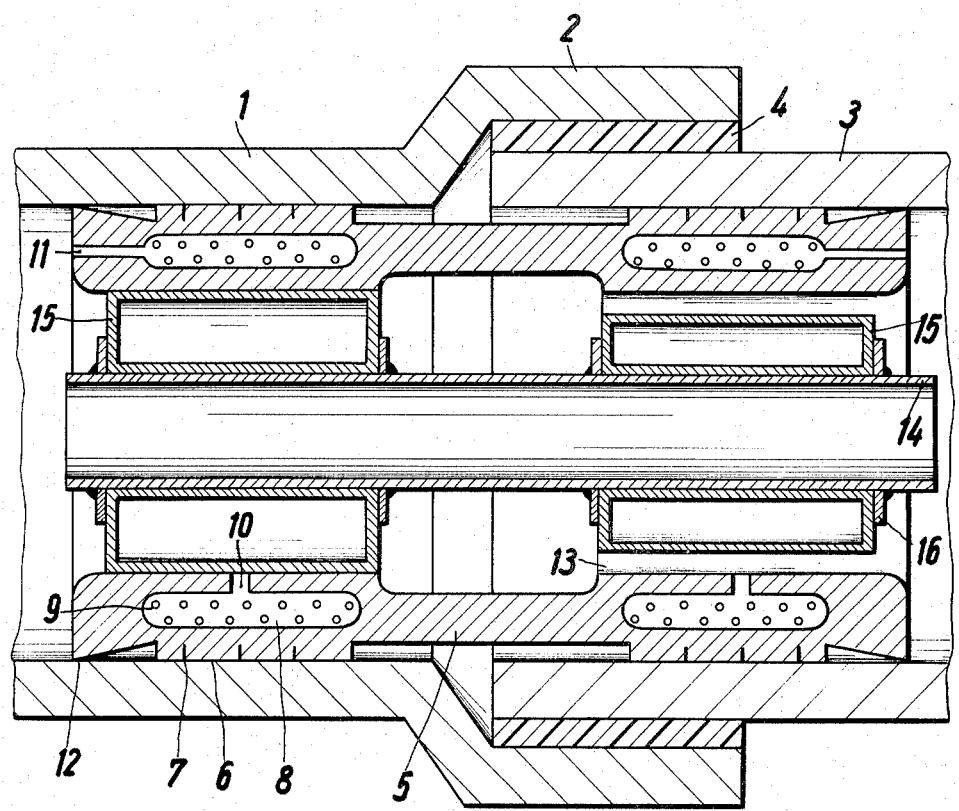

METHOD AND APPARATUS FOR SEALING PIPE SECTIONS

This invention relates to an apparatus for the internal sealing of pipe joints for pipe sections.

Inspectible or patrollable pipelines are laid whilst employing pipe sections resulting in pipe joints which must be sealed to prevent the liquid present in the pipe from penetrating into the soil and, liquid from the soil penetrating into the pipeline. During the laying operation, the joints are sealed by equipping the gap between overlapping pipe sections with a seal which is inserted from the outside by caulking. This seal inserted from the outside loses its sealing action after retracted periods of operation, resulting in the need for subsequent re-sealing of the pipe joints. To prevent digging out of the leaking pipe joint, a packing seal has already become known with which the ducts may be sealed from the inside. This known sleeve or packing seal consists of an annular sleeve of resilient material bridging the gap, which is held in contact against the inner side of the pipeline under pressure by annular wedging elements. This subsequently inserted seal of the pipe joint is to substitute for the external leaking seal. If this internal seal is to secure an unexceptionable sealing action, it must accommodate itself to the frequently occurring relative displacements between the pipeline sections. It must equally adapt itself to the non-circularities and differences in internal diameter of the pipeline caused by differences within tolerance limits. This seal must moreover accommodate for damage to the inner pipe surface, which may occur during operation. The known sealing sleeves have two sealing faces situated with spacing from each other, which must be thrust against the internal pipe surfaces with the entire area corresponding to the width of the spreader ring. To secure a satisfactory seal and overbridge the existing displacements, non-circularities, differences in diameter and superficial damage, the contact thrust exerted by the spreader ring must be very great. This may perforce deleteriously affect the durability of the sealing sleeve if the contact pressure exceeds the limit of elasticity of the sleeve material, in order to overbridge greater unevennesses within the pipeline. Moreover, the application of spreader rings required for the known annular sleeves or liners causes an appreciable increase in cost. The installation of the spreader rings is costly moreover, since they must be installed within the pipeline, the insertion and fastening of the spreader elements insertible between the extremities of the spreader ring within the pipeline being very difficult and onerous particularly since special devices are required for this purpose. Furthermore, the application of the known sealing sleeves complete with their spreader rings is unsatisfactory in the pipelines of egg-shaped cross-section which are frequently employed nowadays, since a peripherally uniform contact pressure cannot be obtained in view of this non-circular cross-section.

The invention attempts to eliminate the disadvantages inherent in the known packing or sleeve seals. The present invention eliminates the application of spreader rings and the consequent cost and fitting expenses necessary in known seals, and accommodates for any pipe cross-section, in which any unevennesses present in the pipeline are reliably bridged, without having to strain the material of the seal beyond the limit of elasticity.

According to the present invention therefore, there is a packing seal for the internal sealing of pipe joints in patrollable pipelines, consisting of an annular sleeve of resilient material overbridging the gap having annular sealing surfaces situated at either side of the gap, which are held in sealing contact on the inner surfaces of the two pipe sections of the pipeline characterised in that a duct-like annular cavity which may be filled with a flowable and rapidly setting material increasing in volume during solidification, for example consisting of a plastic material containing a foaming agent, for example known under the name of "plastic cement", and corresponding to the width of the sealing surface is situated in the region of each of the sealing surfaces of the annular sleeve.

Another feature of the invention is characterised in that annular reinforcing inserts are situated within the cavities.

The invention moreover consists in that each cavity is equipped with one inwardly directed perforation and with an axially parallel outwardly directed perforation.

It is essential moreover that the sealing surfaces of the sleeve are equipped with annular incisions situated with spacing from each other.

Another feature of the invention relates to the device for the installing of the sleeve and is characterised in that it consists of a tube insertible into the sleeve, on which are fastened two annular tubes of resilient material, which may be pressurised and which may be placed in contact under pressure with the inner surfaces of the sleeve corresponding to the sealing surfaces.

The packing seal or sleeve according to the invention is produced by the extrusion process, in known manner; pieces corresponding to the diameter of the seal are cut off the extrusion, the reinforcing inserts are placed in the cavities, and the extremities of the extruded element are then vulcanised together, thereby obtaining the finished sleeve seal with the reinforcing inserts situated within the cavities. To be able to feed the plastic cement into the cavities, a radial perforation leading into the cavity from the inner side, and a second diametrically opposed, axially parallel perforation equally leading into the cavity, are incorporated. This sleeve seal is placed in position in the pipeline, whereupon the cavity is filled with plastic cement, for example by injection through the radial perforation, until it emerges from the second diametrically opposed perforation. The material available on the market under the name "plastic cement" is known; it consists of a plastic material which is rapidly converted from the fluid to the solid state, its volume being increased by approx. 5 percent during the setting period by the foaming agent contained in the material. As soon as the plastic cement has been fed into the cavity, the tube with its hoses is inserted into the sleeve seal; the two hoses are pressurised by means of compressed air and bear under pressure against the inner faces opposed to the sealing surfaces. This contact pressure may be chosen of different magnitude depending on the prevailing conditions of operation; it prevents the inner surfaces opposed to the sealing surfaces from becoming inwardly convex during the solidification and prevents increase in volume of the plastic cement. The sealing surfaces of the sleeve seal are pressed against the inner surface of the pipe by the solidifying plastic cement, in this manner. It is clear that all the unevennesses present in the inner surface of the pipe are concomitantly and reliably filled in, since the solidifying plastic material mandatorily presses the sealing surfaces in uniform manner against the inner pipe surface at all points during its increase in volume, and thereby reliably fills in all unevennesses. The same result is perforce obtained in the case of pipelines of oval cross-section. A uniform hermetic contact is obtained in this manner throughout the internal periphery of the pipeline in the case of pipelines of circular or oval cross-section, concomitantly overbridging unevennesses in the inner surfaces in reliably sealing manner. After solidification of the plastic cement, the insert tube is removed under pressure-relief of the hoses, the sealing contact being maintained, particularly since the reinforcing insert prevents changes in the position of the plastic cement. The sealing action may be increased by coating either the sealing surface of the sleeve seal or the inner surface of the pipe with a bituminous adhesive, in known manner. The adhesive is concomitantly forced into the annular incisions of the sealing surfaces and reliably bonds the sealing surfaces to the inner surface of the pipe.

The accompanying drawing shows a form of embodiment of the packing or sleeve seal given by way of example.

A pipe joint is formed between the pipe section 3 and the collar 2 of another pipe section 1 partially overlapping the former. A seal 4 is inserted into the overlap during the laying operation of a pipeline. Since this seal 4 does not fully retain its sealing action in the course of a longer period of operation, a sealing sleeve 5 or collar is installed within pipe sections 1 and 3. The sleeve 5 comprises two cylindrical sealing surfaces 6 which are spaced apart, and equipped with annular spaced incisions 7. Each sealing surface 6 has an annular recess which is partially defined by a sealing lip 12 at an end of the sealing sleeve 5. A cavity 8 is situated within the sealing sleeve 5 at a position adjacent each sealing surface 6 and is equipped with reinforcing inserts 9. The sealing sleeves 5 are produced by an extrusion process, sections corresponding to the diameter of the sleeve 5 being cut off the extrusion. The reinforcing insert 9 is then inserted into these cuttings. The extruded parts are then bent to form a tube and their adjacent extremities are interconnected by vulcanising.

A radial conduit 10 opening into the cavity 8 is drilled from inside the sealing sleeve 5 thus produced. An axially directed conduit 11 is formed in the sealing sleeve 5 and opens into the cavity 8.

The seal is formed between pipe sections 1 and 3 as follows.

When the sealing sleeve 5 is in position within the pipe sections 1 and 3, a plastic cement material is fed into the cavity 8 through the radial conduit 10, until the material issues from the conduit 11. Immediately thereafter, the pipe 14 is fitted into the sleeve seal 5 and hoses 15, fastened on the pipe 14 and located by flanges 16, are pressurised by compressed air until they are brought to bear on the inner surfaces 13 of the sealing sleeve 5, surfaces 13 being adjacent the sealing surfaces 6. By virtue of the pressure of air in the hoses 15 the latter are forced against the surfaces 13, so that the plastic cement, which is increasing in volume during solidification, lays the sealing surfaces 6 against the inner surface of the pipe with the required pressure which is necessary for sealing the inner surface of a pipe having surface deformities. The pressure formed in the hoses 15 is such that the elastic limit of the material of the sealing sleeve 5 is not exceeded as the pressure rises due to the increase in volume of the plastic material. The pipe 14 has a cross-sectional shape similar to that of the pipe sections 1 and 3, i.e. a round cross-sectioned pipe is employed for circular pipe sections of, whereas a pipe 14 correspondingly egg-shaped in cross-section is employed for pipe sections of egg-shaped cross-section, the hoses 15 exerting an uniform pressure on the surfaces 13 of the sealing sleeve 5.

What we claim is:

1. A sealed joint between two pipe sections having overlapping ends, comprising a seal disposed between said overlapping ends, and a further seal disposed within both pipes and sealingly contacting the interiors of both pipes adjacent said ends, said further seal comprising a sealing sleeve of resilient material having two axially spaced annular external surface portions one in sealing contact with each of said pipe sections.

2. Structure as claimed in claim 1, said sealing sleeve also having an annular cavity adjacent each end thereof, and a solidified expanded foamed plastic material in said cavities.

3. Structure as claimed in claim 3, and a first conduit extending between each said cavity and an internal surface of the sealing sleeve.

4. Structure as claimed in claim 1, and a second conduit extending between each said cavity and an end surface of the sealing sleeve.

5. A method of sealing pipe sections having adjacent end portions, comprising locating a sealing sleeve of resilient material within said pipe sections with one end of said sleeve disposed within each said end portion and the sleeve bridging between said pipe sections within said pipe sections, each said end of the sleeve having a cavity therein, injecting a hardening material into each said cavity, inserting inflatable means within said sleeve, inflating said inflatable means into contact with said sleeve to force at least the portions of said sleeve adjacent said cavities into sealing contact with the interior of said pipe end portions until said hardening material has hardened, and then deflating and removing said inflatable means from within said sleeve.

6. A method as claimed in claim 5, in which said hardening material is a foaming synthetic resin that expands upon setting.

* * * * *